United States Patent [19]
Birmanns

[11] Patent Number: 5,717,753
[45] Date of Patent: Feb. 10, 1998

[54] SWITCHING MAT FOR A TELEPHONE OR RADIO HANDSET

[75] Inventor: Thomas Birmanns, Ingolstadt, Germany

[73] Assignee: Temic Telefunken microelectronic Gmbh, Heilbronn, Germany

[21] Appl. No.: 569,587

[22] Filed: Dec. 8, 1995

[30] Foreign Application Priority Data

Dec. 22, 1994 [DE] Germany ............... 44 45 840.1

[51] Int. Cl.$^6$ ......................................... H04M 1/00
[52] U.S. Cl. ................. 379/419; 379/428; 379/433
[58] Field of Search ........................... 379/433, 428, 379/419; 455/90, 89; D14/148, 150, 147

[56] References Cited

U.S. PATENT DOCUMENTS

| | | | |
|---|---|---|---|
| D. 306,291 | 2/1990 | Watanabe et al. | 379/433 |
| 4,791,526 | 12/1988 | Breu et al. | 379/433 |
| 5,371,790 | 12/1994 | Nevo et al. | 379/433 |
| 5,461,672 | 10/1995 | Enokido et al. | 379/433 |

FOREIGN PATENT DOCUMENTS

| | | | |
|---|---|---|---|
| WO 8201632 | 5/1982 | Austria | 379/433 |
| 297023 | 12/1988 | Germany | 379/433 |
| 3826570 | 2/1990 | Germany. | |
| 4313711 | 11/1994 | Germany. | |
| 2010444 | 3/1994 | U.S.S.R. | 379/433 |
| 2187062 | 8/1987 | United Kingdom | 379/433 |

*Primary Examiner*—Dwayne Bost
*Assistant Examiner*—Keith Ferguson
*Attorney, Agent, or Firm*—Spencer & Frank

[57] ABSTRACT

A handset for telephone and radio systems usually consists of a casing which contains a microphone, a loudspeaker, a printed circuit board carrying the electronic components, and normally also a switching mat made of a rubber type material (e.g. silicone), which switching mat is integrated into a keypad such that the keys of the keypad act on this switching mat to close switching contacts. According to the invention, the switching mat comprises a cavity corresponding to the external shape of the loudspeaker such that the loudspeaker can be introduced into this cavity either from the rear or from one of the adjacent front ends of the switching mat. This results in a significant simplification of the assembly process, as well as a major improvement in shock and vibration protection.

37 Claims, 2 Drawing Sheets

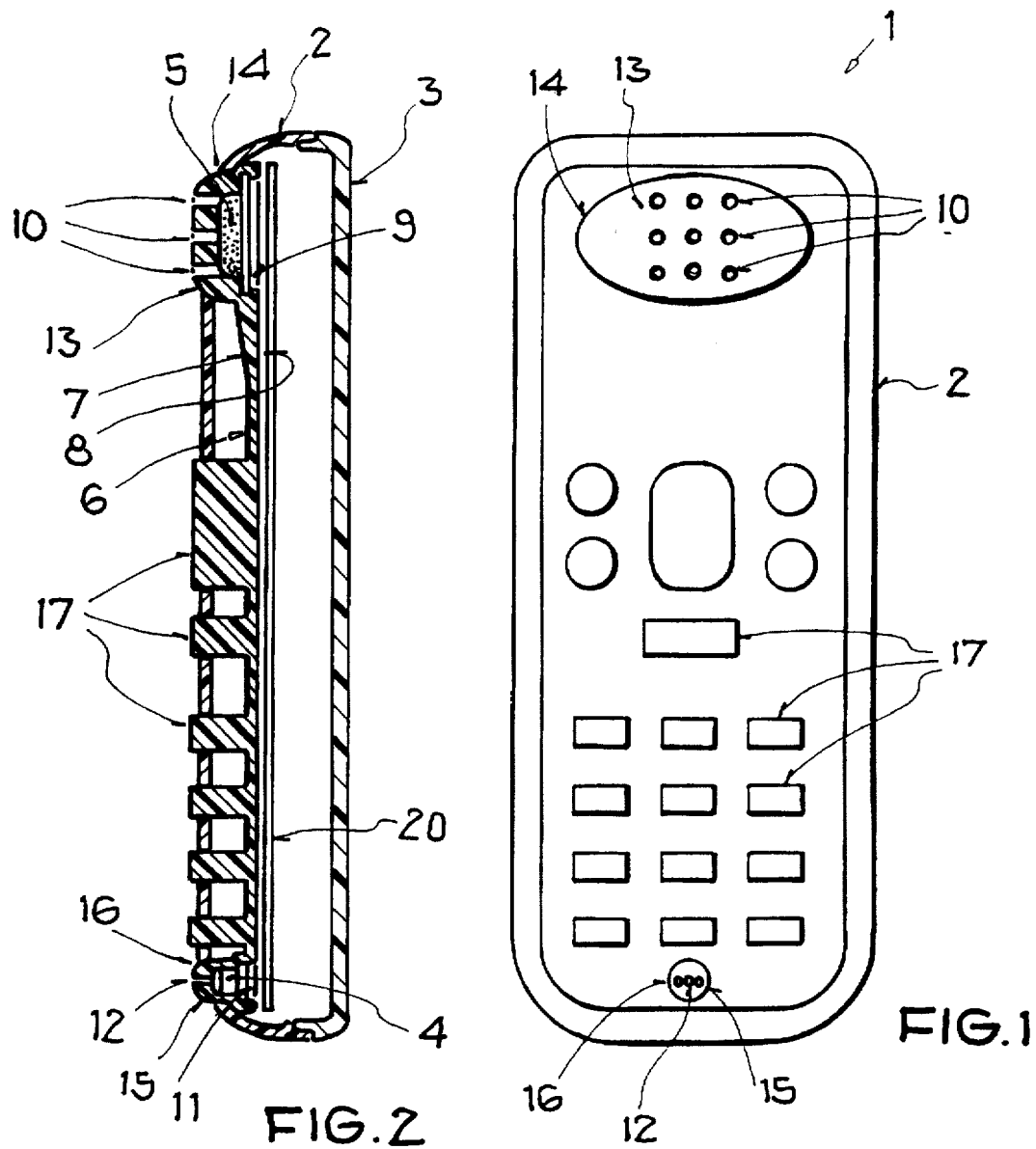

SWITCHING MAT FOR A TELEPHONE OR RADIO HANDSET

BACKGROUND OF THE INVENTION

The invention concerns a handset comprising a microphone and a loudspeaker for telephone and radio systems, whereby the handset is constructed from a casing, a switching mat or pad complete with front and rear side, and a printed circuit board carrying electrical components.

Known handsets are constructed such that separate fittings are required for installing loudspeaker and microphone, whereby installation will involve more work and thus be more costly.

SUMMARY OF THE INVENTION

The object of the invention is to provide a handset of the type described above which can be constructed from just a few individual components, and thus be manufactured at low cost.

According to the invention, the switching mat is provided with a cavity corresponding to the external shape of the loudspeaker such that the loudspeaker can be inserted into this cavity. In addition to facilitated and simplified assembly, such embedding of the loudspeaker into the switching mat, as provided for by the invention, also results in an acoustic and mechanical decoupling of the loudspeaker from the other components and casing parts of the handset.

Correspondingly, the microphone or a beeper can be integrated by means of a similarly designed cavity in the switching mat such that assembly can be simplified even further.

In another advantageous application of the invention, the front of the switching mat features an elevation in the area of the cavity for accommodating the loudspeaker, which elevation is inserted through an appropriate aperture in the casing and protrudes beyond the casing area surrounding this aperture. Preferably, this elevation can feature an oval- or circular-shape or other advantageous cross-section, and is also a scratch protection device when resting on its face. At the same time, this elevation—in combination with the aperture shaped in accordance with this elevation—is a retaining aid when assembling the casing complete with switching mat.

Furthermore, this elevation in the area of the loudspeaker will lead to an improved handling by the user of the handset, as by means of this elevation, the rubber type material forming the elevation will be felt at the ear of the user, thus preventing the handset from sliding off the ear of the user.

Also, a corresponding elevation in the area of the cavity accommodating the microphone, as well as an aperture to be fitted into the casing, can be provided, resulting in corresponding advantages.

Finally, the cavity provided for accommodating the loudspeaker, as well as the cavity provided for accommodating the microphone, can be designed such that in the sound output and/or the sound input areas the cavity will be widened to produce a resonant space. By this means, improved acoustic characteristics can be achieved, in particular it will be possible to drive the microphone or loudspeaker with reduced electrical power input.

BRIEF DESCRIPTION OF THE DRAWINGS

Below, the invention is to be further described and explained using embodiment examples in connection with the drawings wherein FIG. 1 is a planview of an embodiment example of a handset according to the invention, FIG. 2 is a cross-sectional view of the embodiment example according to FIG. 1, FIGS. 3 and 4 are cross-sectional views in the loudspeaker area of further embodiment examples of a handset according to the invention.

DESCRIPTION OF THE PREFERRED EMBODIMENTS

Figure 3:
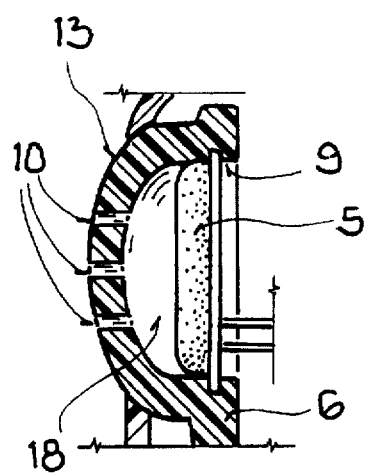

In a casing comprised of top 2 and bottom 3, the handset 1 according to FIGS. 1 and 2 contains a printed circuit board 20 carrying electronic components, as well as a switching mat 6 of a rubber type material, e.g., silicone, located between this printed circuit board 20 and top 2. This switching mat 6 features key buttons 17 for constructing a keypad, and also comprises a cavity 9 at its top edge for accommodating a loudspeaker 5. This cavity 9 is accessible from the rear 8 of switching mat 6 and adapted to the shape of loudspeaker 5 so that this loudspeaker 5 can be introduced from the rear 8 into this cavity 9 as a secure fit. The cavity 9 is connected via several sound channels 10 with the front side 7 of switching mat 6. In this area of cavity 9, the switching mat 6 is provided with an elevation 13 located on its front side 7, which elevation 13 features an oval-shaped cross-section according to FIG. 1 and is inserted through casing top 2 by means of an appropriately adapted aperture 14 such that the elevation 13 protrudes beyond the area surrounding the aperture 14.

At the lower edge of switching mat 6, a cavity 11 is similarly provided for accommodating a microphone 4. From the rear 8 of switching mat 6, the microphone 4 is introduced into this cavity as a secure fit. Sound channels 12 provide the connection between this cavity 11 and the front side 7 of switching mat 6. Finally, in the area of this cavity 11, an elevation 15 is provided also, which elevation 15 protrudes from an appropriately shaped aperture 16 in casing top 2.

The advantages of these cavities 9 and 11 for loudspeaker 5 or microphone 4 consist of the resulting optimum acoustic and mechanical decoupling from the other components located in the handset, as well as its casing parts. In addition, there results a simple assembly process for the loudspeaker and the microphone, as these components are only pressed into their respective cavity, obviating the need for any other fittings. The elevations 13 and 15 within the area of the loudspeaker 5 or the microphone 4 serve as scratch protection, if the user places the handset on its face.

Using the switching mat 6 according to FIG. 2, additional functions can be integrated such as, for instance, a spacer for two printed circuit boards, or a mounting for a light-emitting diode located such that it shows at the front of the casing.

Embedding loudspeaker 5 and microphone 4 into switching mat 6—as well as further components, if necessary—results in a significantly improved shock and vibration protection for these components.

Figure 5:
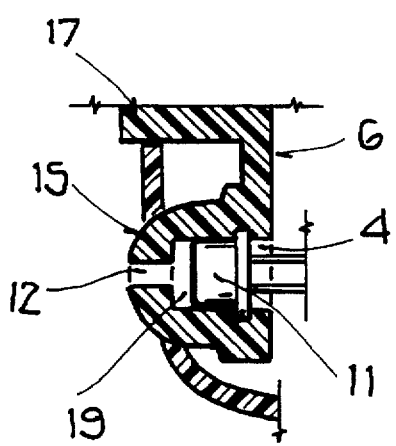
FIGS. 5 and 6 are cross-sectional views in the microphone area of the latter embodiment examples of a handset according to the invention.

FIGS. 3 and 5 show a cavity 9 for a loudspeaker 5, or a cavity 11 for a microphone 4, respectively which cavities have been widened such that within the sound output or the sound reception areas, these cavities are widened sufficiently to provide a resonant space 18 or 19. Such a resonant space 18 or 19 can be easily adapted to relevant requirements, as only minor tool changes will be necessary in order to manufacture a relevant switching mat 6. Such a resonant space will result in improved acoustic characteristics.

Figure 4:
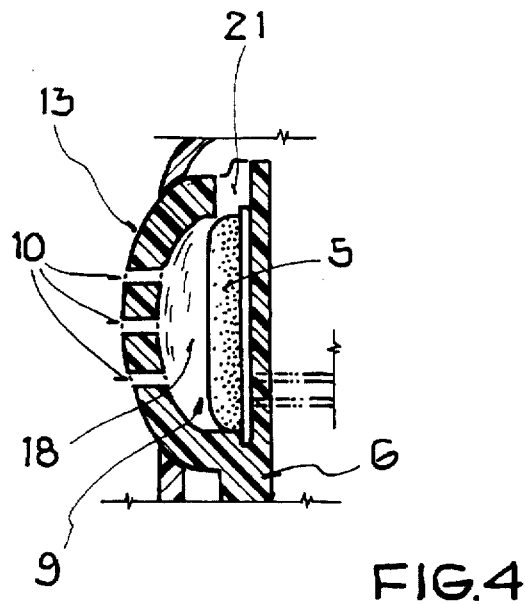
Figure 6:
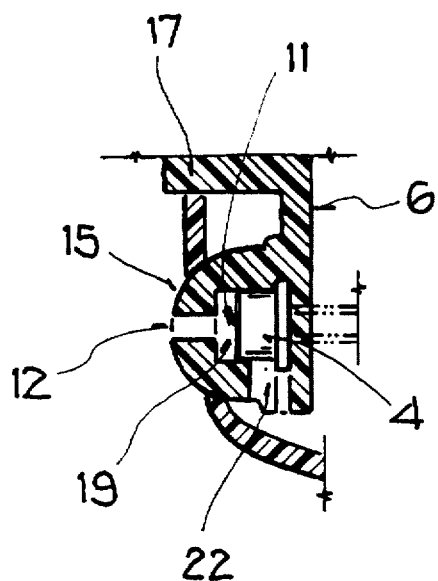

Finally, the embodiment examples according to FIGS. 4 and 6 show a cavity 9 for the loudspeaker 5 or a cavity 11 for the microphone 4, which cavities are pocket-shaped such that the cavities 9 or 11 are accessible via a slot 21 or 22 for the loudspeaker 5 or the microphone 4, with these slots 21 or 22 being respectively located at the short front side of switching mat 6. Thus, the loudspeaker 5, as well as the microphone 4, can slide into the respective cavities 9 or 11, forming a secure fitting, via these slots 21 and 22. In this way, the loudspeaker 5 and the microphone 4 are provided with a secure mounting.

The microphone described in the above embodiment examples may also just be a beeper.

What is claimed is:

1. A handset complete with a microphone and a loudspeaker for telephone systems, with the handset further including a casing, a switching mat, formed of a rubber-like material and complete with a front and a rear side, which cooperates with the keys of a keypad to close switching contacts, and a printed circuit board carrying electrical components, and with the microphone, loudspeaker, switching mat and printed circuit board being disposed within the casing, and wherein the switching mat is provided with a cavity corresponding to the external shape of the loudspeaker and in which the loudspeaker is disposed, with the cavity being formed, such that the loudspeaker can be introduced into this cavity.

2. A handset according to claim 1 wherein the cavity is designed such that the loudspeaker can be introduced into this cavity from the rear of the switching mat.

3. A handset according to claim 2 wherein at least one connection channel links the cavity with the front side surface of the switching mat for the purpose of sound output.

4. A handset according to claim 3 wherein, for accommodating the microphone, the switching mat has a further cavity adapted to the external shape of the microphone and in which the microphone is disposed, with the further cavity being formed such that the microphone can be introduced into this further cavity from the rear of the switching mat.

5. A handset according to claim 4 wherein at least one connection channel links the further cavity with the front side surface of the switching mat for the purpose of sound input.

6. A handset according to claim 5 wherein the front side of the switching mat has an elevation in the area of the cavity for accommodating the loudspeaker, which elevation extends through an appropriate aperture in the casing and protrudes beyond the casing area surrounding this apeture.

7. A handset according to claim 6 wherein the front side of the switching mat has a further elevation in the area of the further cavity for accommodating the microphone, which further elevation extends through an appropriate further aperture in the casing and protrudes beyond the casing area surrounding this further aperture.

8. A handset according to claim 7 wherein the cavity provided for accommodating the loudspeaker is such that a resonant space is created within the cavity in the sound output area of the loudspeaker.

9. A handset according to claim 8 wherein the further cavity provided for accommodating the microphone is such that a resonant space is created within the further cavity in the sound reception area of the microphone.

10. A handset according to claim 9 wherein the loudspeaker and the microphone are located on opposite ends of the switching mat.

11. A handset according to claim 10 wherein a keypad and indicator elements are located between the opposite ends of the switching mat.

12. A handset according to claim 3 wherein, for accommodating the microphone, the switching mat features a further cavity adapted to the external shape of the microphone, and having a pocket shape, such that the microphone can be introduced from one of the adjacent from ends of the switching mat into this further cavity.

13. A handset according to claim 12 wherein at least one connection channel links the further cavity with the front side surface of the switching mat for the purpose of sound input.

14. A handset according to claim 13 wherein the front side of the switching mat has an elevation in the area of the cavity for accommodating the loudspeaker, which elevation extends through an appropriate aperture in the casing and protrudes beyond the casing area surrounding this aperture.

15. A handset according to claim 14 wherein the front side of the switching mat has a further elevation in the area of the further cavity for accommodating the microphone, which further elevation extends through an appropriate further aperture in the casing and protrudes beyond the casing area surrounding this further aperture.

16. A handset according to claim 15 wherein the cavity provided for accommodating the loudspeaker is such that a resonant space is created within this cavity in the sound output area of the loudspeaker.

17. A handset according to claim 16 wherein the further cavity provided for accommodating the microphone is such that a resonant space is created within the further cavity in the sound reception area of the microphone.

18. A handset according to claim 17 wherein the loudspeaker and the microphone are located on opposite ends of the switching mat.

19. A handset according to claim 18 wherein a keypad and indicator elements are located between the opposite ends of the switching mat.

20. A handset according to claim 1 wherein the cavity has a pocket shape such that the loudspeaker can be introduced into this cavity from one of the adjacent front ends of the switching mat.

21. A handset according to claim 20 wherein at least one connection channel links the cavity with the front side surface of the switching mat for the purpose of sound output.

22. A handset according to claim 21 wherein, for accommodating the microphone, the switching mat features a further cavity adapted to the external shape of the microphone such that the microphone can be introduced into this further cavity from the rear of the switching mat.

23. A handset according to claim 22 wherein at least one connection channel links the cavity with the front side surface of the switching mat for the purpose of sound input.

24. A handset according to claim 23 wherein the front side of the switching mat has an elevation in the area of the cavity for accommodating the loudspeaker, which elevation extends through an appropriate aperture in the casing and protrudes beyond the casing area surrounding this aperture.

25. A handset according to claim 24 wherein the front side of the switching mat has a further elevation in the area of the further cavity for accommodating the microphone, which further elevation extends through an appropriate further aperture in the casing and protrudes beyond the casing area surrounding this further aperture.

26. A handset according to claim 25 wherein the cavity provided for accommodating the loudspeaker is such that a resonant space is created within the cavity in the sound output area of the loudspeaker.

27. A handset according to claim 26 wherein the further cavity provided for accommodating the microphone is such that a resonant space is created within the further cavity in the sound reception area of the microphone.

28. A handset according to claim 27 wherein the loudspeaker and the microphone are located on opposite ends of the switching mat.

29. A handset according to claim 28 wherein a keypad and indicator elements are located between the opposite ends of the switching mat.

30. A handset according to claim 21 wherein, for accommodating the microphone, the switching mat has a further cavity adapted to the external shape of the microphone, and in a pocket shape, such that the microphone can be introduced from one of the adjacent front ends of the switching mat into this further cavity.

31. A handset according to claim 30 wherein at least one connection channel links the further cavity with the front side surface of the switching mat for the purpose of sound input.

32. A handset according to claim 31 wherein the front side of the switching mat has an elevation in the area of the cavity for accommodating the loudspeaker, which elevation extends through an appropriate aperture in the casing and protrudes beyond the casing area surrounding this aperture.

33. A handset according to claim 32 wherein the front side of the switching mat has a further elevation in the area of the further cavity for accommodating the microphone, which further elevation extends through an appropriate further aperture in the casing and protrudes beyond the casing area surrounding this aperture.

34. A handset according to claim 33 wherein the cavity provided for accommodating the loudspeaker is such that a resonant space is created within the cavity in the sound output area of the loudspeaker.

35. A handset according to claim 34, wherein the further cavity provided for accommodating the microphone is such that a resonant space is created within the further cavity in the sound reception area of the microphone.

36. A handset according to claim 35 wherein the loudspeaker and the microphone are located on opposite ends of the switching mat.

37. A handset according to claim 36 wherein a keypad and indicator elements are located between the opposite ends of the switching mat.

\* \* \* \* \*